United States Patent
Jang (10) Patent No.: US 7,292,138 B2
(45) Date of Patent: Nov. 6, 2007

(54) VEHICLE TIRE WITH RFID TAG (75) Inventor: Chang-soo Jang, Yongin-si (KR)

(73) Assignee: Samsung Techwin, Co., Ltd., Changwon (KR)

( * ) Notice: Subject to any disclaimer, the term of this patent is extended or adjusted under 35 U.S.C. 154(b) by 192 days.

(21) Appl. No.: 11/176,104

(22) Filed: Jul. 7, 2005

(65) Prior Publication Data
US 2006/0038665 A1    Feb. 23, 2006

(30) Foreign Application Priority Data
Aug. 21, 2004   (KR) ...................... 10-2004-0066170

(51) Int. Cl.
*B60C 23/00*   (2006.01)
(52) U.S. Cl. .................. 340/442; 340/426.33
(58) Field of Classification Search ........ 340/442–447, 340/572.8; 257/787
See application file for complete search history.

(56) References Cited

U.S. PATENT DOCUMENTS

2003/0211273 A1   11/2003  Perry et al.
2004/0095244 A1   5/2004   Conwell et al.
2004/0159383 A1*  8/2004   Adamson et al. ........ 152/152.1

OTHER PUBLICATIONS

Smartcode Corp., "Smartcode™ Corp. provides the First EPC RFID Tag For Tire Auto Identification—Company Will Assist to Enhance Tire Recalls Safety," Internet Publication at http://press.arrivenet.com/gov/article.php/469692.html (Oct. 11, 2004).

* cited by examiner

*Primary Examiner*—Jeffery Hofsass
*Assistant Examiner*—Shirley Lu
(74) *Attorney, Agent, or Firm*—Drinker Biddle & Reath LLP

(57)   ABSTRACT

Provided is a vehicle tire with an RFID tag. The damage of the RFID tag or non-recognition problem can be prevented when a severe operating atmosphere is applied to the tire. The RFID tag is mounted on a side of the tire, apart from a bead included on an inner circumference of the tire, within a distance of 0.74 in a radial direction from the bead toward a belt attached to an outer circumference of the tire assuming that the distance from the bead to the belt is 1.

20 Claims, 10 Drawing Sheets

VEHICLE TIRE WITH RFID TAG

CROSS-REFERENCE TO RELATED PATENT APPLICATIONS

This application claims the priority of Korean Patent Application No. 10-2004-0066170, filed on Aug. 21, 2004, in the Korean Intellectual Property Office, the disclosure of which is incorporated herein in its entirety by reference.

BACKGROUND OF THE INVENTION

1. Field of the Invention

The present invention relates to a vehicle tire, and more particularly, to a vehicle tire with an RFID tag that is mounted on the vehicle tire so that the RFID tag works properly even when an external force is applied to the vehicle tire.

2. Description of the Related Art

Recently, wireless communication equipment, such as smart cards or radio frequency identification (RFID) tags, is being used in many industrial fields for various applications including distribution fields for identifying information about products.

A wireless communication system generally includes a RFID tag (i.e., a transponder) that is attached to a product, and a reader that communicates with the RFID tag. The RFID tag includes an antenna and an RFID chip. Thus, information from the reader is received through the antenna and stored in an RFID chip, and the information stored in the RFID chip is transmitted to the reader through the antenna.

Vehicle tires are one kind of product to which this type of wireless communication technique can be applied. If the operation parameters, such as the pressure and temperature, are not properly controlled during a manufacturing process or while driving, there are high risks of breaking the vehicle tire. Therefore, there is a need to monitor the operation parameters of the vehicle tire.

Figure 1:
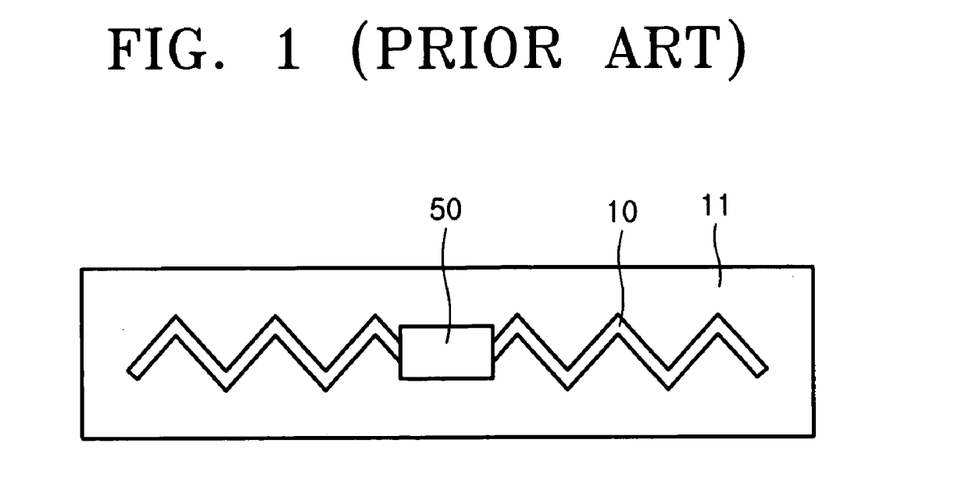
FIG. 1 is a plan view illustrating a conventional RFID tag.
Figure 2:
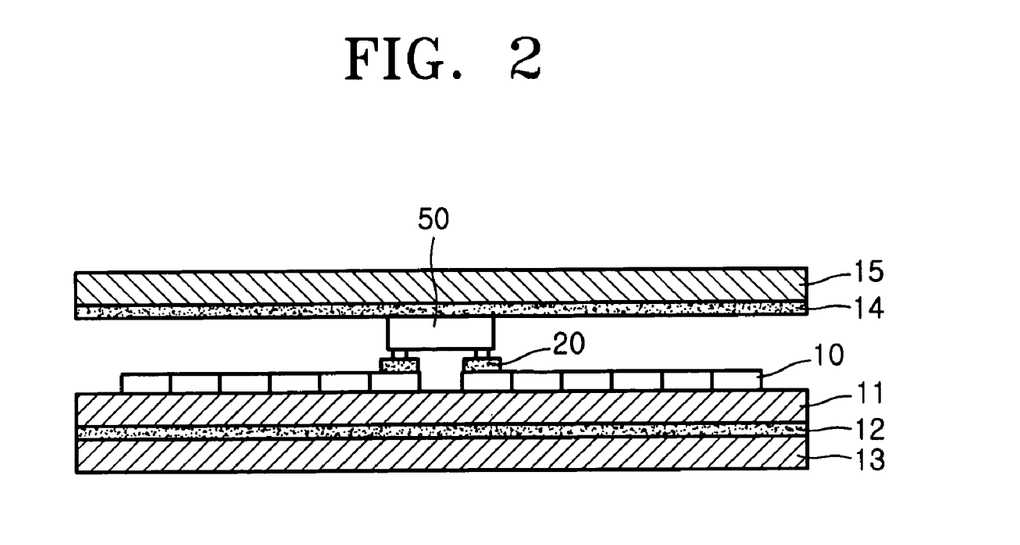
FIG. 2 is a side view of the RFID tag of FIG. 1.

FIG. 1 is a plan view illustrating a conventional RFID tag, and FIG. 2 is a side view of the RFID tag of FIG. 1. For convenience of explanation, the RFID tag of FIG. 1 is depicted without a protection layer and a release layer. The RFID tag includes a thin film 11, an antenna 10 formed on the thin film 11, and an RFID chip 50 bonded to the antenna 10. The thin film 11 can be formed of a polymer such as Polyethylene Terephthalate (PET), Polyvinyl chloride (PVC), or Polyethylene (PE). The antenna 10 can be formed by stacking copper thin layers or aluminum thin layers on a thin film 11 and etching the stacked layers. As depicted in FIG. 2, the RFID chip 50 can be flip-chip bonded on an end of the antenna 10. More specifically, the RFID chip 50 and the antenna 10 can be electrically connected by interposing an anisotropic conductive adhesive 20 therebetween. The protection layer 15 for protecting the RFID tag is disposed on an upper part of the antenna 10, and the release layer 13 for attaching the RFID tag to a product is disposed on a lower part of the antenna 10. Each of the protection layer 15 and the release layer 13 is respectively bonded by adhesives 12 and 14. The RFID tag is attached to a product after removing the release layer 13.

However, when a conventional RFID tag is mounted in a vehicle tire with high pressure, there is a drawback in that a reader can not communicate with the RFID tag since the frequency of the RFID tag varies due to deformations or damages of the antenna 10 or the RFID chip 50. Therefore, an additional means for protecting the RFID tag and a design specification for determining a mounting location where the RFID tag can be protected in consideration of the internal stress distribution in a vehicle tire are required.

SUMMARY OF THE INVENTION

The present invention provides an RFID tag for a vehicle tire that can work properly even when an external force is applied to the tire.

The present invention also provides a design specification with respect to a mounting location of the RFID tag in consideration of the internal stress distribution in a vehicle tire.

According to an aspect of the present invention, there is provided an RFID tag for a vehicle tire. The RFID tag is mounted on a side wall of the tire, apart from a bead formed on an inner circumference of the tire and within a distance of 0.74 in a radial direction from the bead toward a belt attached to an outer circumference of the tire, given that the distance from the bead to the belt is 1.

The RFID tag may include: an antenna having a predetermined operating frequency; an RFID chip bonded to the antenna; a first molding part that seals at least the RFID chip and a bonding part between the RFID chip and the antenna; and a second molding part that seals the first molding part on an outside of the first molding part.

The RFID tag may further include a third molding part outside of the second molding part.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 3:
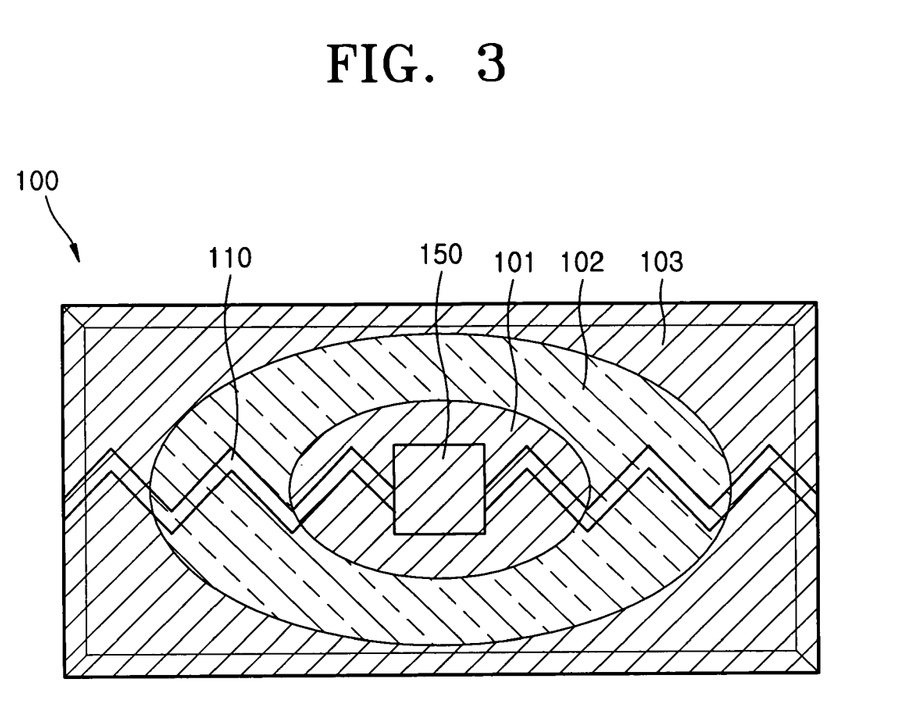
FIG. 3 is a plan view illustrating an RFID tag according to an embodiment of the present invention.
Figure 4:
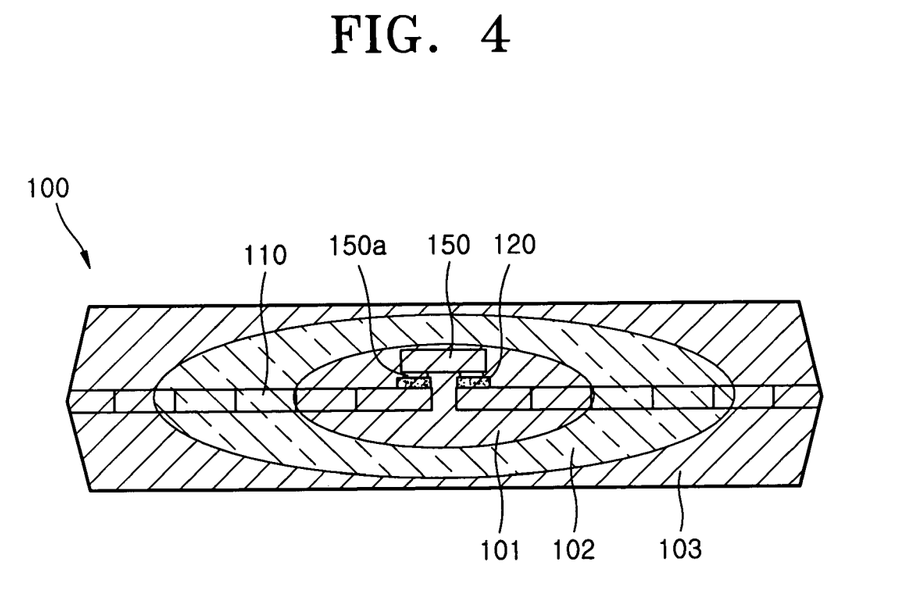
FIG. 4 is a side view of the RFID tag of FIG. 3.

FIG. 3 is a plan view illustrating an RFID tag 100 according to an embodiment of the present invention, and FIG. 4 is a side view of the RFID tag 100 of FIG. 3. The RFID tag 100 includes an antenna 110 having a predetermined operating frequency, an RFID chip 150 bonded to the antenna 110, and molding parts 101, 102, and 103 that cover the antenna 110 and the RFID chip 150. The antenna 110 can be, for example, a two-pole wave antenna.

The RFID chip 150 can be bonded to the antenna 110 by flip-chip bonding using an anisotropic conductive adhesive 120. That is, a pad 150a of the RFID chip 150 and both sides of the antenna 110 can be electrically connected by interposing the anisotropic conductive adhesives 120 therebetween.

The antenna 110 and the RFID chip 150 are encapsulated or otherwise sealed by molding parts 101, 102, and 103. The RFID tag 100 includes the first molding part 101, the second molding part 102 surrounding the first molding part 101 and the third molding part 103 surrounding both of the first and second molding parts 101, 102. The molding parts 101, 102, and 103 are formed of a non-conductive material and protect the antenna 110 and the RFID chip 150 from an external environment.

The first molding part 101 seals the RFID chip 150 and a bonding part between the RFID chip 150 and the antenna 110. The first molding part 101 can be formed of a relatively hard material because a faulty connection between the antenna 110 and the RFID chip 150 may occur if the bonding part is easily deformed by an external force. An epoxy compound is an example of a hard molding material for forming the first molding part 101.

The second molding part 102 disposed on an outer side of the first molding part 101 acts as a buffer layer for reducing stresses transferred to the RFID tag 100 by absorbing an external pressure or an impact. That is, when the RFID tag 100 is mounted on a tire, a significant compression is applied to the tire during driving and a sudden extension or compression is applied to the tire in a tire manufacturing process. As can be appreciated, the RFID tag 100 is subjected to the foregoing forces when affixed to the tire. Therefore, the second molding part 102 has a buffering role to protect the RFID tag 100 from a sudden extension or compression of the tire. The second molding part 102 can be formed of a resin having low elasticity, such as silicon rubber.

The third molding part 103 is disposed on an outside of the second molding part 102, and the third molding part 103 directly contacts the tire on which the RFID tag 100 is mounted. The third molding part 103 can be formed of a rubber material similar to the material for forming the tire to maintain a tight contact with the tire.

Hereinafter, a mounting location where the RFID tag 100 can be protected from forces applied to the tire will now be described.

Figure 5:
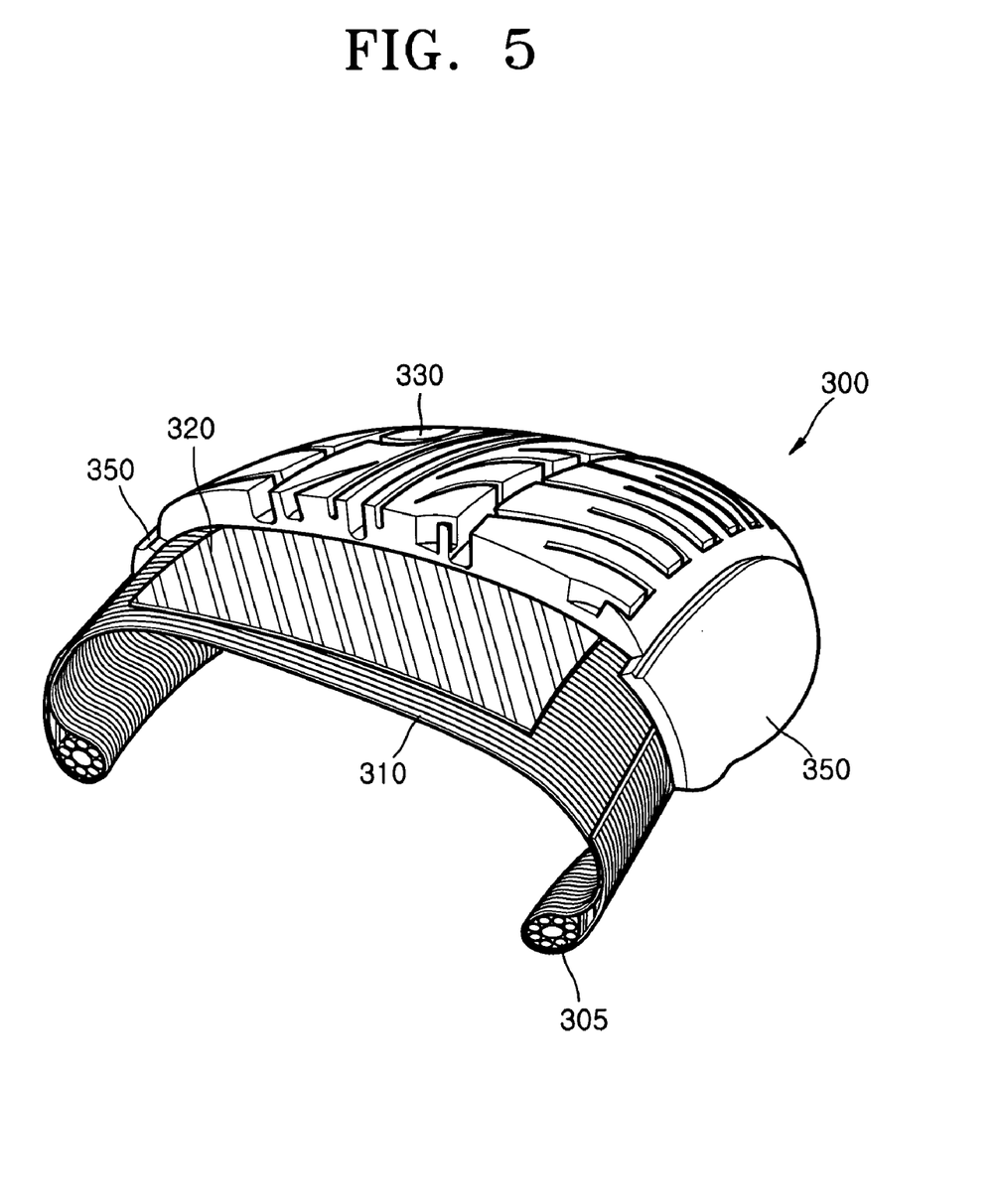
FIG. 5 is a partial cross-sectional perspective view of a vehicle tire on which the RFID tag according to the present invention is applied.

FIG. 5 is a partial cross-sectional perspective view of a vehicle tire 300 on which the RFID tag according to the present invention is mounted. Referring to FIG. 5, the tire 300 comprises a casing 310 (e.g., made of cords) that forms a tire frame for being inserted into a rim, a tread 330 which has a predetermined pattern, is bonded to a circumference of the casing 310, and contacts road surfaces, a belt 320 that limits the movement of the tread 330 by being inserted between the casing 310 and the tread 330, and a side wall 350 bonded to both side surfaces of the casing 310 and extending in a radial direction from the circumference of the rim to the tread 330.

Beads 305 that seals a space formed by the casing 310 and the rim for preventing air leakage from the space, in which air is filled with a predetermined pressure, are formed along an inner circumference of the casing 310. The belt 320 and the beads 305 are formed of steel. As can be appreciated and as will be described hereinafter, in most instances, it is unsuitable to locate an RFID tag proximate the beads 305 and the belt 320. Therefore, according to one aspect of the present invention, an RFID tag will be configured in the side wall 350. In some embodiments, the RFID tag will be completely disposed (e.g., encapsulated, embedded, etc.) in the material of the side wall 350 between the casing 310 and an outer surface of the side wall 350. According to one aspect of the invention, a vehicle tire with RFID tag may be manufactured by affixing the RFID tag on the casing 310, particularly on a vertical side of the casing 310, and then layering, laminating, forming, casting or otherwise disposing layers of flexible material (e.g., rubber) on the casing 310 and RFID tag. Thus, the RFID tag is disposed in the side wall 350 of the tire 300. In other embodiments, the RFID tag may be partially exposed at the outer surface of the side wall 350 to improve communication between the RFID tag and a reader. Hereinafter, it will be understood that terminology such as, for example, "mounted on", "mounting location" and the like does not mean affixed or attached to an exterior surface, but rather is intended to mean embedded, encapsulated, inserted and the like.

Figure 6:
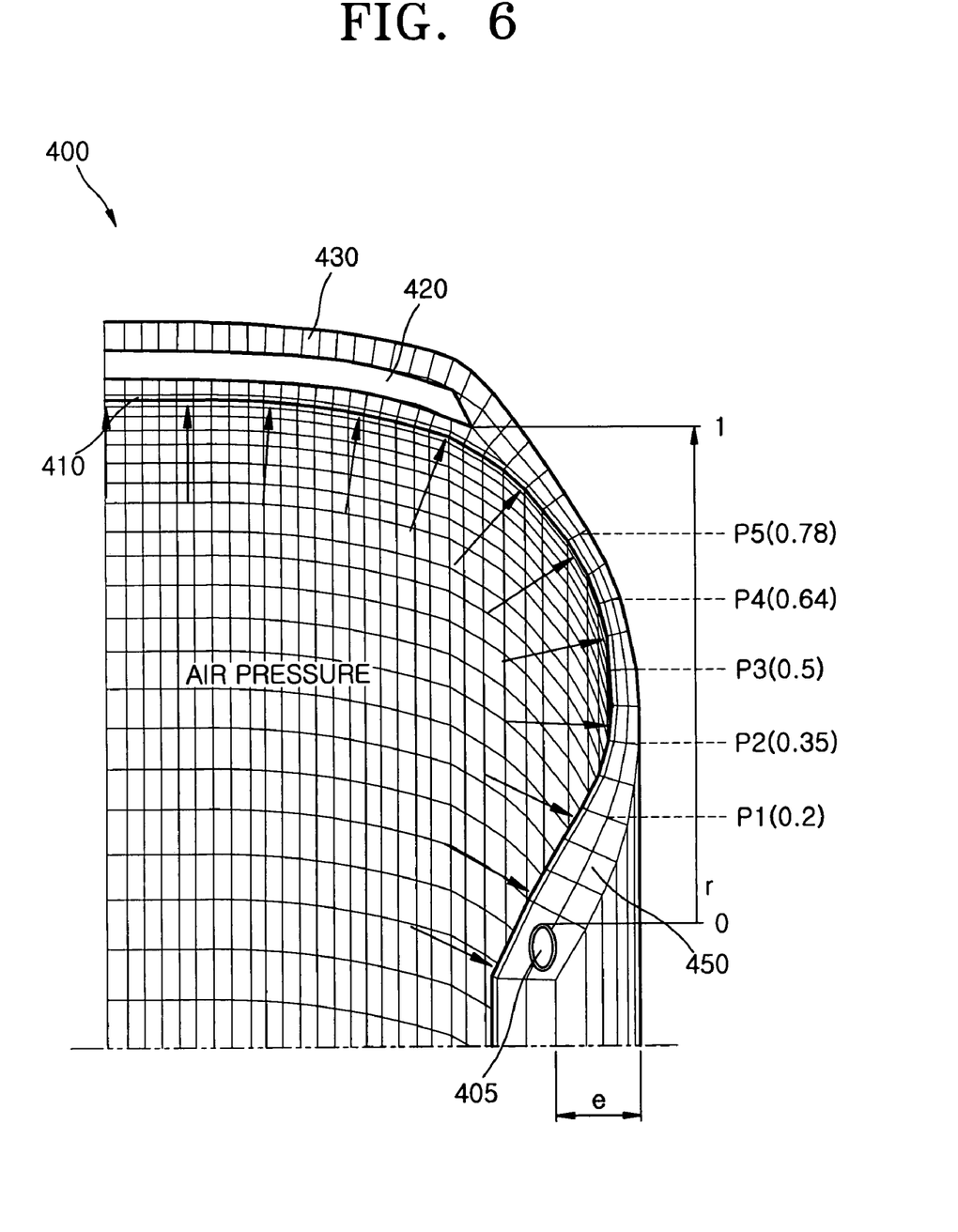
FIG. 6 is a cross-sectional view illustrating a computer model of a vehicle tire for defining a mounting location of an RFID tag.

FIG. 6 is a cross-sectional view illustrating a computer model of a vehicle tire that is used for determining a mounting location on the tire for an RFID tag 100. Referring to FIG. 6, a tire 400 comprises a casing 410 that seals air filled in the tire 400, a belt 420 and a tread 430 that both cover a circumference of the casing 410, and a side wall 450 that covers a side surface of the casing 410.

Figure 7:
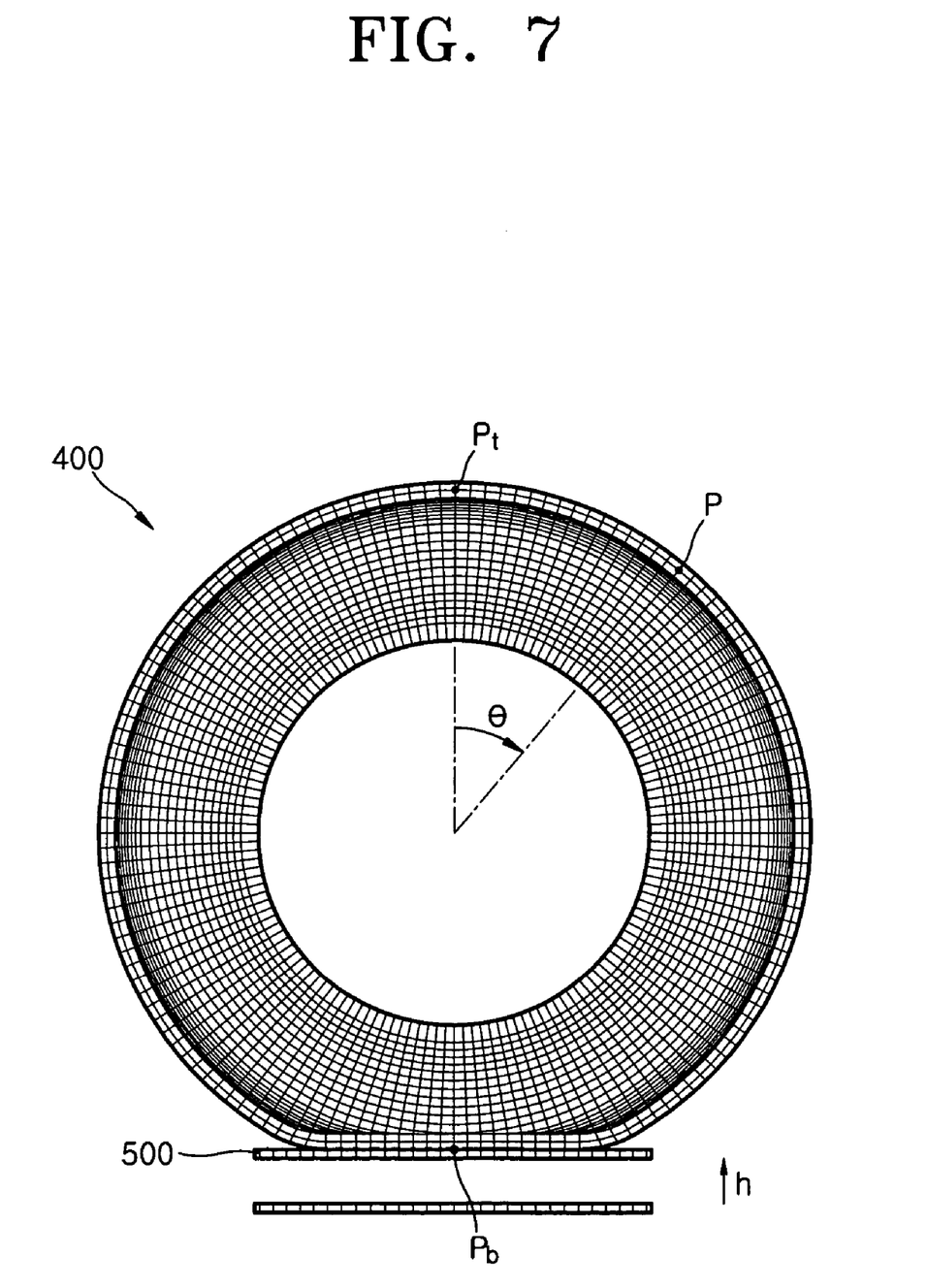
FIG. 7 is another cross-sectional view of the computer model of the vehicle tire of FIG. 6.

Referring to FIG. 7, a tire surface that contacts the ground has a flat shape due to the car weight. Therefore, for the convenience of computer analysis, it is assumed that the ground surface 500 is elevated by a predetermined height h. Also, as depicted in FIG. 6, for a boundary condition, the tire 400 is inflated by filling the casing 410 with air having a predetermined pressure so that the bead 405 is moved inward by a predetermined distance e so that the tire 400 can be mounted on a rim.

An RFID tag 100 according to the present invention is preferably mounted on the side wall 450 instead of the tread 430 of the tire 400, because there is a higher risk of damaging the RFID tag 100 when mounting it in the tread 430. The RFID tag 100 is preferably affixed to a location far enough from the bead 405 and belt 420, both of which are formed of steel, in order not to affect the wireless communication between the RFID tag 100 and a reader.

Therefore, in the present analysis, five mounting points P1 through P5 at different locations in a radial direction between the bead 405 and the belt 420 are selected, and a deformation at each mounting point P1 through P5 is calculated. The distance r in the radial direction to each mounting point P1 through P5 denotes a relative distance assuming that the distance between the bead 405 and the belt 420 is 1 and each distance r is indicated in parenthesis next to each indicated point P1-P5.

Referring to FIG. 7, the deformation at one mounting point P varies periodically according to the rotation of the tire 400. That is, the deformation at an upper point Pt is different from the deformation at a lower point Pb, which is a ground point. Therefore, in the present analysis, the deformations at each mounting point P1 through P5 at angles θ of 0-180° in a circumference direction of the tire 400 were calculated. The same deformation results could be obtained at angles of 180-360° in a circumference direction since the tire 400 is substantially symmetrical.

The deformations of the tire 400 obtained from the computer analysis are used as boundary conditions for calculating a stress distribution at a bonding surface between an RFID chip and a molding part of the RFID tag, which will be described later.

Figure 8:
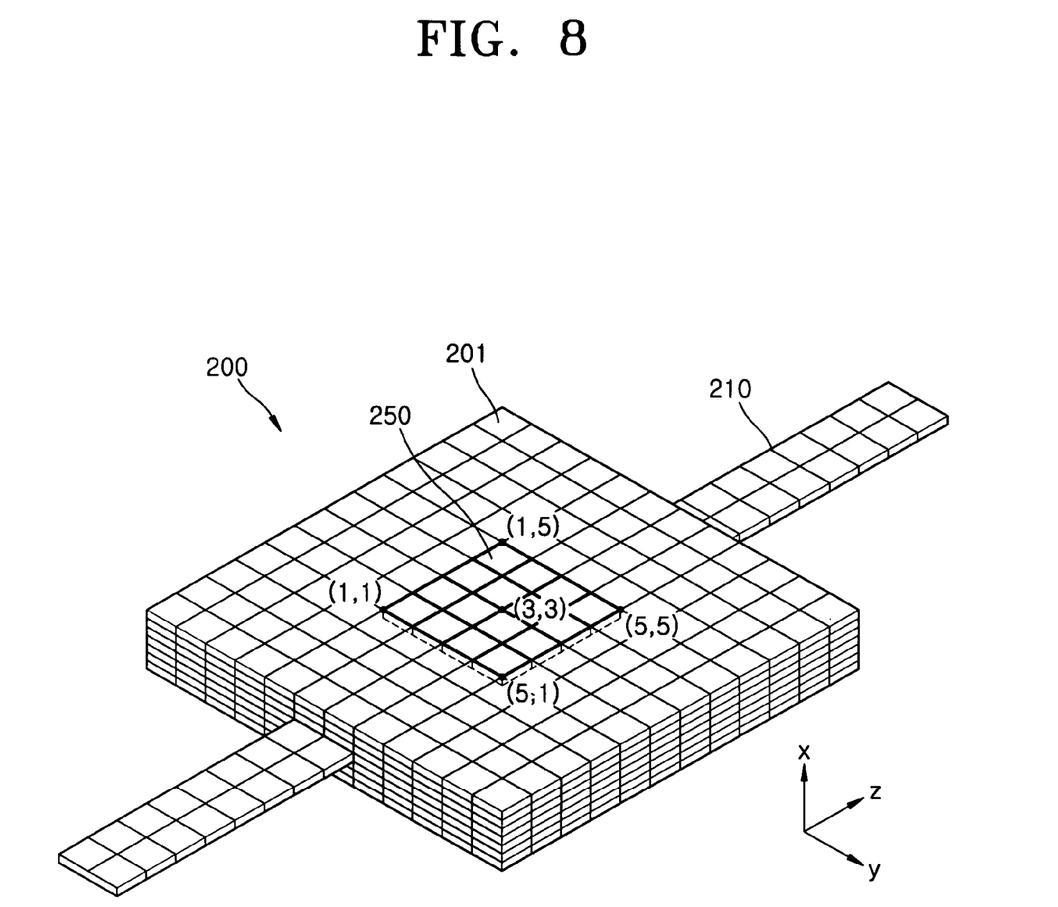
FIG. 8 is a perspective view of a computer model of an RFID tag for defining a mounting location of the RFID tag.

FIG. 8 is a perspective view of a computer analysis model of an RFID tag 200 for determining a mounting location thereof. Referring to FIG. 8, the RFID tag 200 includes an RFID chip 250 and an antenna 210, and the RFID chip 250 is encapsulated or otherwise sealed by a first molding part 201. In FIG. 8, a second molding part is not shown for reasons of clarity, but the second molding part (e.g., second molding part 102, FIGS. 3-4) is disposed on an outside of the first molding part 201.

The RFID chip 250 is modeled in a cube shape and the antenna 210 is modeled in a rod shape. Also, the first molding part 201 is modeled in a cube shape and the second molding part is modeled in a cube shape. The third modeling part is not modeled since the third modeling part, as described above, is substantially formed of a similar material for forming the tire 400. That is, the third molding part can be considered as being a part of (i.e., integral with) the tire. The RFID chip 250 is mounted on the side wall 450 (see FIG. 6) of the tire 400 in a tangential direction.

Physical properties for modelling the RFID chip, the antenna, the first molding part, and the second molding part are the physical property of silicon, copper, epoxy, and silicon rubber, respectively. Table 1 summarizes the physical properties of the components used in the computer analysis.

TABLE 1

|  | RFID chip | Antenna | First molding part | Second molding part |
|---|---|---|---|---|
| Young's Modulus (MPa) | 130,000 | 117,000 | 3,500 | 330 |
| Poisson's ratio | 0.3 | 0.3 | 0.32 | 0.45 |

It has been known that in an electronic package a fatigue failure can occur at a bonding surface between a semiconductor chip and the molding part that seals the semiconductor chip due to a cyclic stress. The cyclic stress can be generated due to the thermal expansion or contraction of the semiconductor chip or, as in the present invention, the cyclic stress in the RFID tag can be generated by a periodical load applied to the RFID tag mounted on a tire. That is, a fatigue failure can be generated at a bonding surface of the RFID chip and a molding part due to the cyclic load.

Referring to FIG. 8, twenty five nodes numbered (1,1) to (5,5) are generated by selecting five rows and five columns on the RFID chip 250 to calculate cyclic stresses at a bonding surface between the RFID chip 250 and the first molding part 201. As shown in FIG. 8, each node is defined at the intersection of a row and a column. The generated nodes form bonding surfaces between the RFID chip 250 and the first molding part 201.

Figure 9:
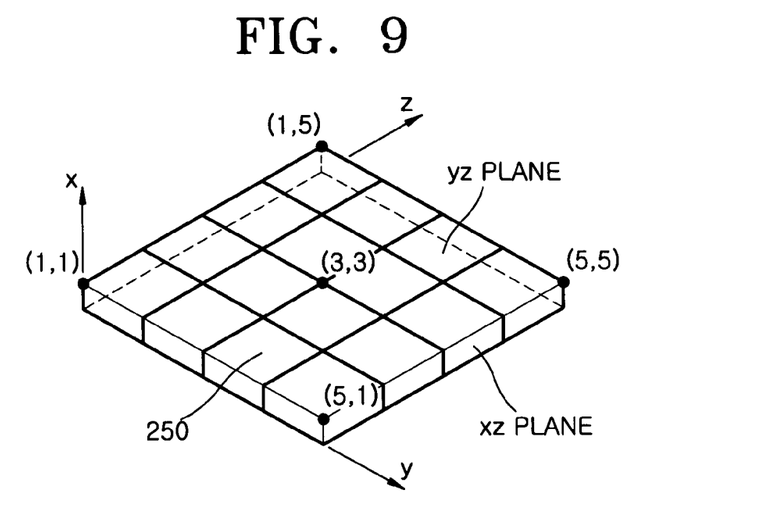
FIG. 9 is a perspective view of a computer model of the RFID chip of FIG. 8.

As described above, cracks are generated at a bonding surface between the RFID chip and the first molding part due to the cyclic load applied to the RFID tag, and the molding part is separated from the RFID chip as the crack progresses. Therefore, in the present computer analysis, forces applied parallel with respect to the bonding surface between the RFID chip and the molding part, that is, shear forces in the xz plane and the yz plane in FIG. 9 are objects to be analyzed. Also, shear forces in the xz plane and the yz plane of a node are objects to be analyzed.

Figure 10:
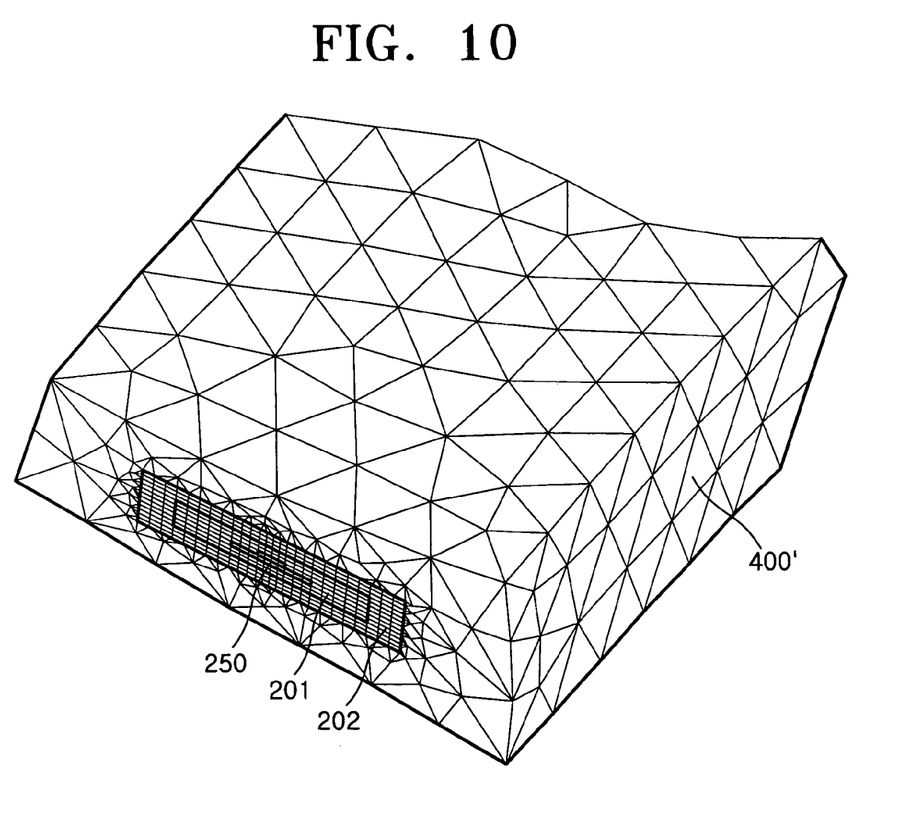
FIG. 10 is a cut away perspective view of a computer model of a tire on which an RFID tag of the present invention is applied.

An RFID tag having the foregoing model is depicted in FIG. 10 as being affixed on a tire 400'. The tire deformations calculated in the previous stage are as boundary conditions in the computer analysis of the tire 400'. The boundary conditions vary according to the distance r (FIG. 6) in a radial direction and the angle θ (FIG. 7) in a circumference direction of the tire 400', and the stress distributions of the twenty five nodes were calculated by changing the angle θ in a circumference direction of the tire 400' with respect to one mounting point (the distance r in a radial direction of the tire is specified).

Figure 11A:
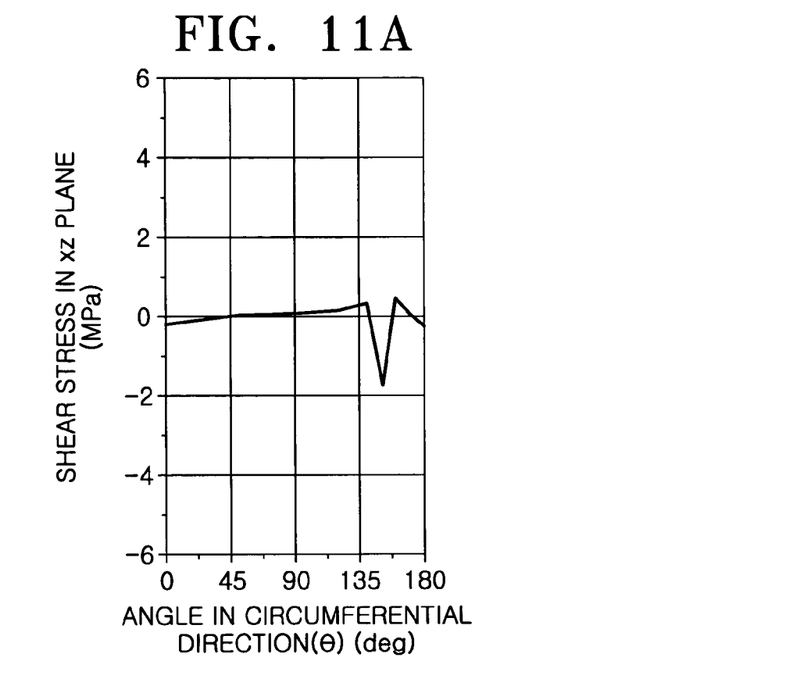
FIGS. 11A and 11B are graphs showing analysis results with respect to shear stresses applied to a node.
Figure 11B:
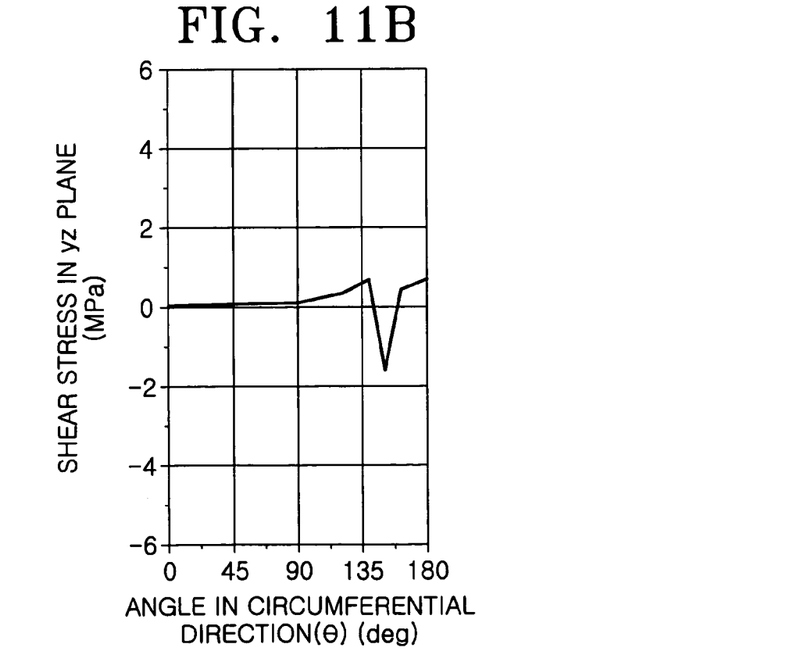

FIGS. 11A and 11B are graphs showing the variation of shear stress that is applied to one (5,1) nodes on one mounting point P3 (see FIG. 6). Referring to FIGS. 11A and 11B, the shear stresses applied in the xz plane and yz plane vary according to the changes of angle θ in a circumference direction. An amplitude (hereinafter, a stress amplitude), which is a number obtained by adding the absolute values of a positive peak and a negative peak, is a very important factor for causing a fatigue failure at a bonding surface between the RFID chip and the molding part, and the stress amplitude remains constant in a circumference direction of a tire 400'. For example, in the node (5,1), the stress amplitude in the xz plane is approximately 2.2 Mpa and that in the yz plane is approximately 2.2 Mpa. The stress amplitude applied in the xz plane $\|\tau_{xz}\|$ and the stress amplitude applied in the xz plane $\|\tau_{yz}\|$ at each node can be converted into an equivalent stress $\tau_{equ}$ by the following equation.

$$\tau_{equ} = \sqrt{\|\tau_{xz}\|^2 + \|\tau_{yz}\|^2}$$

Twenty five equivalent stresses respectively applied to each node at each mounting point are obtained, and there is one maximum equivalent stress at each mounting point among the obtained equivalent stresses.

Figure 12:
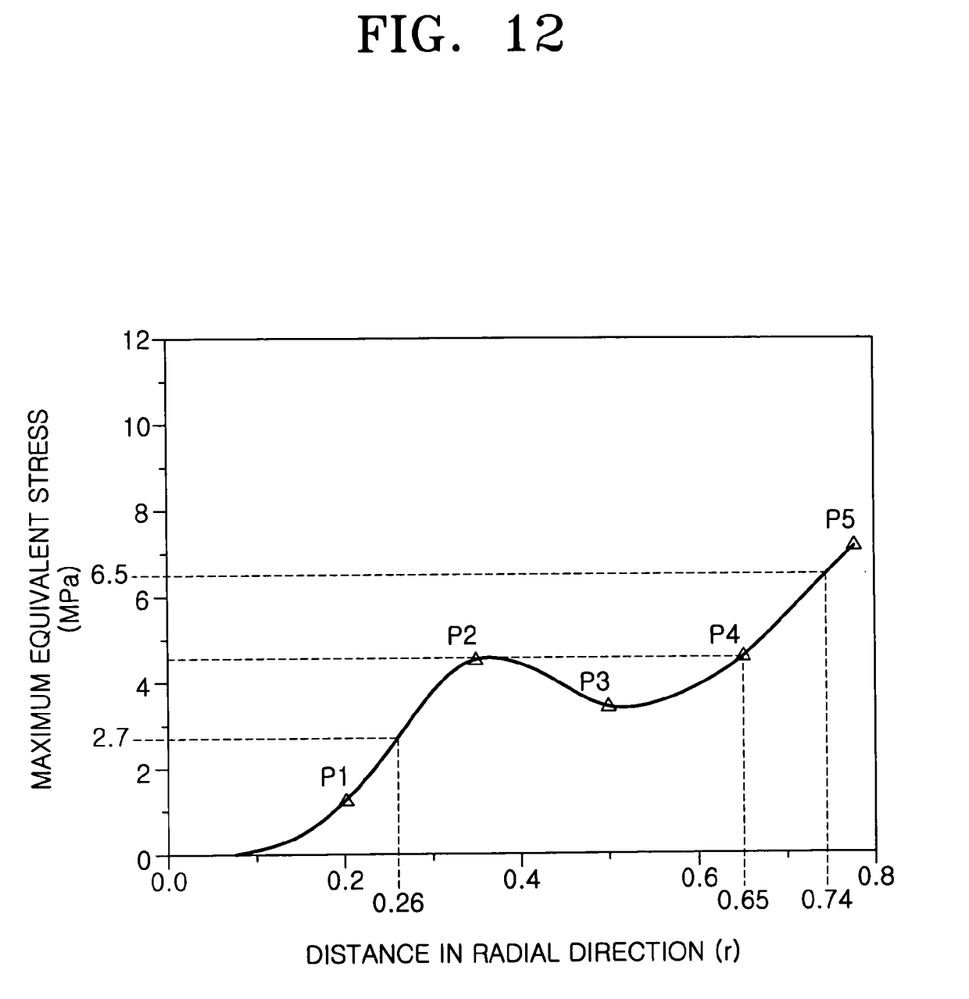
FIG. 12 is a graph showing a profile of maximum equivalent stress with respect to a distance in a radial direction.

FIG. 12 is a graph showing a profile of a maximum equivalent stress according to the distance r in a radial direction of the tire 400. Referring to FIG. 12, the maximum equivalent stress increases as the distance r in a radial direction increases to approximately 0.36 from the bead toward the belt, decreases when the distance r in a radial direction is greater than 0.36 from the bead toward the belt, and increases again when the distance r in a radial direction increases greater than 0.52 from the bead toward the belt. That is, the maximum equivalent stress has two inflection points as the distance r in a radial direction increases. Here, the first inflection point appears at the distance r of 0.36 in a radial direction from the bead toward the belt, and at this point, the maximum equivalent stress is 4.5 Mpa. The second inflection point appears at the distance r of 0.52 in a radial direction from the bead toward the belt, and at this point, the maximum equivalent stress is 3.4 Mpa. If a fatigue failure does not occur at the equivalent stress of 4.5 Mpa, the RFID tag can be mounted at a location within the distance of 0.65 in a radial direction from the bead toward the belt which is a distance r having the same maximum equivalent stress as the first inflection point after passing the second inflection point because the maximum equivalent stress at the first inflection point is the greatest in this range.

A relationship between the fatigue failure and a stress ratio $\tau/\tau_{adh}$ at a bonding surface between a semiconductor chip and an epoxy resin that seals the semiconductor chip has been disclosed in the article "Parametric Dependence of Fatigue of Electronic Adhesive" by Alex Gladkov and Avram Bar-Cohen published in IEEE TRANSACTIONS ON COMPONENT AND PACKAGING TECHNOLOGY, VOL. 22, NO. 2, which is incorporated herein by reference. Here, $\tau_{adh}$ indicates a maximum bonding strength of the epoxy resin, and the maximum bonding strength denotes a critical stress at which the epoxy resin does not peel off from the semiconductor chip even if unlimited cycles of shear stress less than the critical stress is applied to the bonding surface. Also, $\tau$ indicates an equivalent shear stress that represents stresses applied to many surfaces and various directions and corresponds to the maximum equivalent stress depicted in FIG. 12.

Also, the following fatigue lifetime equation has been proposed in the aforementioned article.

$$N_f = \frac{A}{\exp\left(17\frac{t}{\tau_{adh}}\right)} \times f^{0.3}$$

Here, $N_f$ represents the number of load cycles that generates a fatigue failure (hereinafter, fatigue failure load cycles) at a bonding surface, and f represents a frequency of the load. Also, A is a constant according to a shape of the bonding surface and has a positive value.

In the present invention, the tire rotates $1.82\times10^7$ times assuming that the average diameter of the tire is 70 cm and the lifetime distance of the tire is 40,000 km. Accordingly, $1.82\times10^7$ times of cyclic loads are applied to the RFID tag mounted on the tire. If the fatigue failure load cycles are greater than $1.82\times10^7$, it can be assumed that the fatigue failure does not occur within the lifetime of the tire. Also, assuming that the average driving speed of a car is 60 km/h, the frequency f of the load is 7.58 Hz.

In the case of epoxy, the maximum bonding strength $\tau_{adh}$ is in a range of 16-25 Mpa, and the constant A has a value in a range of approximately $4.6\times10^7 \sim 7.2\times10^8$ when the bonding surface is flat. The maximum bonding strength $\tau_{adh}$ varies according to the fatigue resistivity of the epoxy, mixing degree of impurities, and the roughness and humidity of the surface where the epoxy is applied. The constant A also varies according to the planarity of the bonding surface.

In the present invention, when assuming that the bonding surface between the first molding part formed of epoxy and the RFID chip has an average level of bonding condition, the values of the maximum bonding strength $\tau_{adh}$ of epoxy and the constant A are 20 Mpa and $10^8$, respectively.

Figure 13:
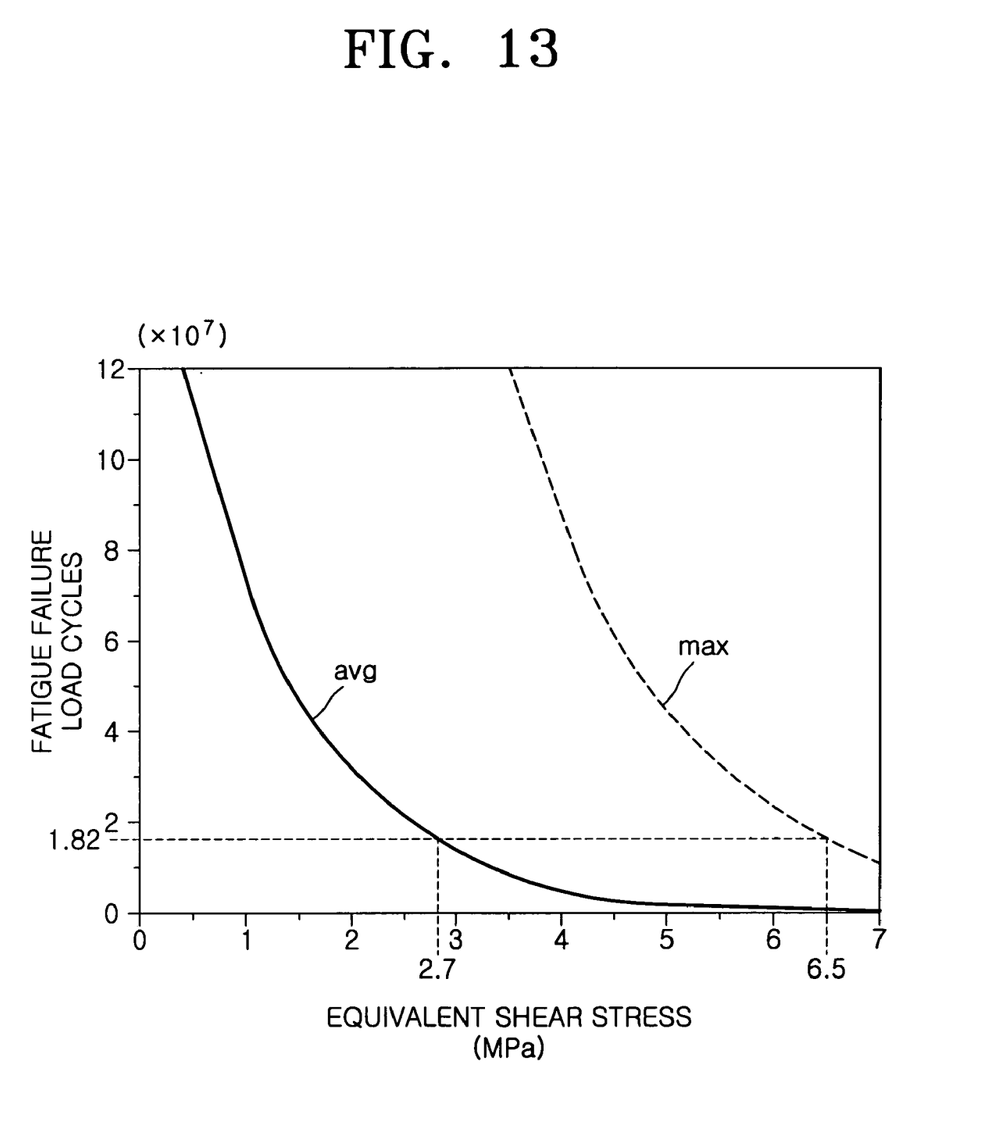
FIG. 13 is a graph showing a fatigue failure load cycle with respect to an equivalent shear stress.

FIG. 13 is a graph showing fatigue failure load cycles according to equivalent shear stresses when the bonding surface between the first molding part formed and the RFID chip has an average level of bonding condition (profile avg). Referring to FIG. 13, an equivalent shear stress less than 2.7 Mpa must be applied so that the fatigue failure load cycles can be greater than $1.82\times10^7$. Here, referring to FIG. 12 again, the RFID tag must be mounted within the distance of 0.26 in a radial direction from the bead toward the belt so that the maximum equivalent stress of less than 2.7 Mpa can be applied.

The values of the maximum bonding strength and the constant A are 25 Mpa and $7.2\times10^8$, respectively, since the maximum bonding strength and the constant A have maximum values within the aforementioned ranges when the bonding condition is optimum. In FIG. 13, the fatigue failure load cycles according to the variation of equivalent shear stresses when the bonding condition is optimum is shown. The equivalent shear stress of less than 6.5 Mpa must be applied so that the fatigue failure load cycles can be greater than $1.82\times10^7$. Referring to FIG. 12 again, the RFID tag must be mounted within a distance of 0.74 in a radial direction from the bead toward the belt so that the maximum equivalent stress of less than 6.5 Mpa can be applied.

In the accompanied drawings of the present invention, a two-pole antenna is depicted for the convenience of explanation, but the present invention is not limited thereto and a monopole antenna can also be applied.

According to various aspects of the present invention, the RFID tag for a vehicle tire has the following advantages:

First, with proper placement of the RFID tag in the side wall of the vehicle tire, potential damage to the RFID tag can be prevented. The RFID tag according to the present invention can function properly even if the RFID tag is mounted on a vehicle tire on which a heavy load is applied since the RFID tag includes at least two different layers of molding parts, and the damage of the RFID tag and the non-recognition problem of the reader can be prevented.

Second, a design specification for mounting the location of the RFID tag is provided. According to the present invention, design parameters and the ranges of the design parameters are provided by analyzing an internal stress distribution in a tire.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An inflatable tire for a vehicle, the inflatable tire comprising:
   a casing including a substantially planar band forming an outer circumference, a bead that mates with a rim of a wheel of the vehicle and forms an inner circumference and a toroidal wall extending between the bead and the substantially planar band;
   a rubber layer disposed on the casing and including a tread that is configured over the substantially planar band and a side wall that is configured over the toroidal wall; and
   an RFID tag including an RFID chip, an antenna connected to the RFID chip, a first molding part that encapsulates the RFID chip and a first portion of the antenna, and a second molding part that encapsulates the first molding part and a second portion of the antenna, which is different from the first portion.

2. The inflatable tire of claim 1 wherein the RFID tag is configured in the side wall and spaced away from the bead by a radial distance between about 0.36 and 0.65 of the height of the toroidal wall.

3. The inflatable tire of claim 1 wherein the first molding part comprises an epoxy having a maximum bonding strength in a range of about 15 Mpa to 25 Mpa.

4. The inflatable tire of claim 1 wherein the second molding part comprises silicon rubber.

5. The inflatable tire of claim 1 further comprising a third molding part that encapsulates the second molding part and a third portion of the antenna so the antenna is fully encapsulated.

6. The inflatable tire of claim 5 wherein the third molding part comprises a rubber that is substantially similar to the rubber layer.

7. The inflatable tire of claim 1 further comprising an anisotropic conductive adhesive that is interposed between the antenna and a connector of the RFID chip to electrically interconnect the RFID chip and the antenna.

8. An inflatable vehicle tire comprising:
a casing including an endwall ring, a first sidewall extending radially inward from a first edge of the endwall ring, a second sidewall extending radially inward from a second edge of the endwall ring and beads terminating each of the first and second sidewalls, wherein the beads contact with a rim of a wheel to seal air between the casing and the wheel;
a belt disposed on the endwall ring;
a rubber layer including sidewall portions covering outer surfaces of the first and second sidewalls and a tread bonded to the endwall ring and the belt, the tread having a pattern for contacting with a road surface; and
an RFID tag disposed in one of the sidewall portions and spaced radially away from the beads by a distance no greater than 0.74 of a distance between the beads and the belt, wherein the RFID tag includes:
an RFID chip including a connector;
an antenna bonded with the connector of the RFID chip;
a first molding part that encapsulates the RFID chip, the connector and a first portion of the antenna; and
a second molding part that encapsulates the first molding part and a second portion of the antenna, which is different from the first portion of the antenna.

9. The inflatable vehicle tire of claim 8 wherein the first molding part comprises an epoxy having a maximum bonding strength in a range of about 15 Mpa to 25 Mpa.

10. The inflatable vehicle tire of claim 8 wherein the second molding part comprises a resin having a low elasticity.

11. The inflatable vehicle tire of claim 10 wherein the resin comprises silicon rubber.

12. The inflatable vehicle tire of claim 8 further comprising a third molding part that encapsulates the second molding part and a third portion of the antenna so the antenna is fully encapsulated.

13. The inflatable vehicle tire of claim 12 wherein the third molding part is substantially similar to the rubber layer.

14. The inflatable vehicle tire of claim 8 further comprising an anisotropic conductive adhesive that is interposed between the antenna and the connector to electrically interconnect the RFID chip and the antenna.

15. The inflatable vehicle tire of claim 8 wherein the RFID tag is distal from the beads by a distance between about 0.36 and 0.65 of a height of one of the first and second sidewalls.

16. A vehicle tire comprising:
a casing including an endwall ring, a side portion extending radially inward from each edge of the endwall ring and a bead that terminates each side portion and contacts with a rim of a wheel to seal air between the casing and the rim;
a flexible tread bonded to the endwall ring and having a pattern for contacting with a road surface;
a flexible sidewall bonded to each side portion and the flexible tread; and
an RFID tag including a chip, an antenna with a first portion connected to the chip and a second portion that is different from the first portion, and an encapsulation including a first molding part that covers the chip and the first portion of the antenna, and a second molding part that covers the first molding part and the second portion of the antenna,
wherein the RFID tag is disposed in the flexible sidewall and spaced away from the bead by a distance no greater than 0.74 of a height of the side portion.

17. The vehicle tire of claim 16 wherein the RFID tag is distal from the bead by a distance between about 0.36 and 0.65 of a height of the side portion.

18. The vehicle tire of claim 16 wherein the first molding part of the encapsulation:
comprises an epoxy material surrounding the chip and the first portion of the antenna, the epoxy material having a bonding strength in the range of about 15 to 25 Mpa; and
the second molding part of the encapsulation comprises a resin material surrounding the first molding part and the second portion of the antenna, the resin material having a low elasticity.

19. The vehicle tire of claim 18 wherein the encapsulation further comprises a flexible encapsulation of a material substantially similar to the flexible sidewall, the flexible encapsulation surrounding the second molding part and a third portion of the antenna to completely encapsulate the antenna.

20. The vehicle tire of claim 1 wherein the RFID tag is connected to the side wall and spaced away from the bead by a radial distance no greater than 0.74 of a height of the toroidal wall.

* * * * *